US012512031B1

(12) United States Patent
Jiang et al.

(10) Patent No.: US 12,512,031 B1
(45) Date of Patent: Dec. 30, 2025

(54) DISPLAY DEVICE AND CONTROL THEREOF

(71) Applicant: Guangzhou China Star Optoelectronics Semiconductor Display Technology Co., LTd., Guangdong (CN)

(72) Inventors: Sanlong Jiang, Guangdong (CN); Shiqiang Yu, Guangdong (CN); Fulin Tang, Guangdong (CN); Tianru Zong, Guangdong (CN); Kyunho Kim, Guangdong (CN)

(73) Assignee: Guangzhou China Star Optoelectronics Semiconductor Display Technology Co., Ltd., Guangdong (CN)

( * ) Notice: Subject to any disclaimer, the term of this patent is extended or adjusted under 35 U.S.C. 154(b) by 0 days.

(21) Appl. No.: 19/028,458

(22) Filed: Jan. 17, 2025

(30) Foreign Application Priority Data

Oct. 17, 2024 (CN) ......................... 202411455900.5

(51) Int. Cl.
*G09G 3/20* (2006.01)
*G09G 3/36* (2006.01)

(52) U.S. Cl.
CPC ............. *G09G 3/2007* (2013.01); *G09G 3/36* (2013.01); *G09G 2320/0247* (2013.01); *G09G 2340/0435* (2013.01); *G09G 2360/16* (2013.01)

(58) Field of Classification Search
CPC ................... G09G 3/2007; G09G 3/36; G09G 2320/0247; G09G 2340/0435; G09G 2360/16
See application file for complete search history.

(56) References Cited

U.S. PATENT DOCUMENTS

| | | | | |
|---|---|---|---|---|
| 2009/0040146 | A1* | 2/2009 | Takeuchi | G09G 3/299 345/63 |
| 2009/0141176 | A1* | 6/2009 | Tomisaka | G09G 3/2007 348/E5.061 |
| 2014/0267370 | A1* | 9/2014 | Albrecht | G09G 5/006 345/602 |
| 2014/0267448 | A1* | 9/2014 | Albrecht | G09G 3/3406 345/84 |
| 2020/0374497 | A1* | 11/2020 | Ikezoe | G09G 5/006 |
| 2022/0051602 | A1* | 2/2022 | Park | G09G 5/06 |
| 2022/0223092 | A1* | 7/2022 | Lee | G09G 3/2007 |
| 2022/0293028 | A1* | 9/2022 | Li | G09G 3/20 |
| 2023/0070610 | A1* | 3/2023 | Zhang | G09G 3/3291 |
| 2023/0282154 | A1* | 9/2023 | Sohn | G09G 3/32 |
| 2023/0298524 | A1* | 9/2023 | Cho | G09G 3/3225 345/691 |
| 2023/0368723 | A1* | 11/2023 | Ra | G09G 3/2096 |
| 2024/0021130 | A1* | 1/2024 | Ha | G09G 3/3291 |

(Continued)

*Primary Examiner* — Michael J Jansen, II
(74) *Attorney, Agent, or Firm* — PV IP PC; Christopher S. Ruprecht; Wei Te Chung

(57) ABSTRACT

A method includes: measuring a duration of the high level of a frame start signal of a display device; calculating a current driving frequency for the display device based on the duration of the high level; updating a chromaticity coordinate accuracy lookup table for a predetermined target grayscale when the current driving frequency is lower than a preset threshold; and adjusting luminance of the display device based on the updated chromaticity coordinate accuracy lookup table.

16 Claims, 3 Drawing Sheets

(56) References Cited

U.S. PATENT DOCUMENTS

| | | | | |
|---|---|---|---|---|
| 2024/0087541 | A1* | 3/2024 | Nojima | G09G 3/3677 |
| 2025/0022402 | A1* | 1/2025 | Lee | G06F 3/0412 |
| 2025/0124881 | A1* | 4/2025 | Kim | G09G 3/3233 |

* cited by examiner

DISPLAY DEVICE AND CONTROL THEREOF

CROSS-REFERENCE TO RELATED APPLICATION

This application claims priority to Chinese Patent Application No. 202411455900.5, filed on Oct. 17, 2024, the disclosure of which is incorporated herein by reference in its entirety.

TECHNICAL FIELD

The present application relates to display technologies, and in particular to a display device and control thereof.

BACKGROUND

With the variable refresh rate (VRR) technology, the driving frequency for a liquid crystal display (LCD) panel can be dynamically adjusted according to the input image information, thereby improving display effect and user experience. However, in the LCD panel, a change in the driving frequency may lead to a change in luminance. If the driving frequency changes abruptly and the luminance changes excessively, the human eye may perceive a flicker, so that the viewing experience is affected.

In order to address the issue, various luminance compensation solutions have been proposed. These solutions generally require storage of a large amount of compensation data to adapt to luminance changes at different refresh rates. For example, for a typical LCD panel, it may be necessary to store data of 256×3×10=7680 bits for each refresh rate for luminance compensation. The VRR technology needs to support multiple refresh rates and thus has a requirement for a large storage space of the timing controller for storing the compensation data.

The timing controller is a core control chip for the LCD panel, and the storage space of the timing controller directly affects the cost and performance of the entire display device. A large storage space of the timing controller not only causes an increase in the manufacturing cost of the timing controller but may also cause problems such as increases in chip size and power consumption.

Moreover, in a display device including a timing controller with a large storage space, when the refresh rate changes, a large amount of compensation data needs to be quickly read and applied, which may cause a response delay in the display device and affect the user experience. Therefore, in regard to the VRR technology, there is a need for effectively reducing the storage space of the timing controller for storing compensation data while ensuring the luminance compensation effect.

SUMMARY

According to some embodiments of the present application, a method includes: measuring a duration of a high level of a frame start signal of a display device; calculating a current driving frequency for the display device based on the duration of the high level; in response to determining that the current driving frequency is lower than a preset threshold, updating a chromaticity coordinate accuracy lookup table for a predetermined target grayscale; and adjusting luminance of the display device based on the updated chromaticity coordinate accuracy lookup table.

According to some embodiments of the present application, a display device includes: a display panel and a timing controller electrically connected to the display panel. The timing controller is configured to perform the following operations: measuring a duration of a high level of a frame start signal of the display panel; calculating a current driving frequency for the display panel based on the duration of the high level; in response to determining that the current driving frequency is lower than a preset threshold, updating a chromaticity coordinate accuracy lookup table for a predetermined target grayscale; and adjusting luminance of the display panel based on the updated chromaticity coordinate accuracy lookup table.

DETAILED DESCRIPTION

Some embodiments of the present application will be described in detail below with reference to the accompanying drawings. The embodiments are described for illustrative purposes only and are not intended to limit the present application.

Terms such as "first", "second" and similar expressions do not indicate any order, quantity, or importance, but are merely used to distinguish different technical features. Terms such as "multiple" and similar expressions indicate two or more, unless otherwise specified.

Figure 1:
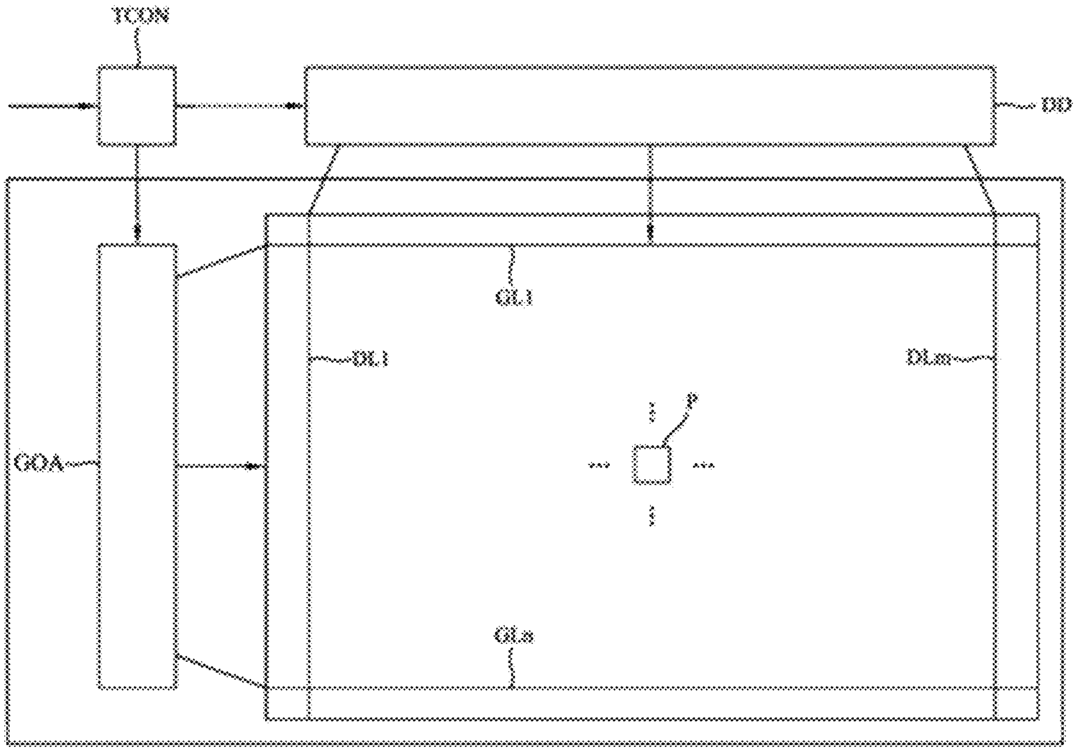
FIG. 1 is a schematic block diagram of a display device according to some embodiments of the present application.

As shown in FIG. 1, a display device according to some embodiments of the present application includes a display panel (for example, LCD panel), a timing controller TCON, a source drive circuit DD, and a power management chip (which is not shown in the figure and can be integrated with the timing controller TCON into the same chip). The LCD panel includes multiple pixel units P, multiple scan lines (GL1 to GLn), multiple data lines (DL1 to DLm), and a gate drive circuit GOA, etc. The multiple pixel units P are arranged in rows and columns, the gate drive circuit GOA is electrically connected to the multiple scan lines (GL1 to GLn), the source drive circuit DD is electrically connected to the multiple data lines (DL1 to DLm), the scan lines (GL1 to GLn) and the data lines (DL1 to DLm) are electrically connected to the pixel units P, and the timing controller TCON is electrically connected to the gate drive circuit GOA and the source drive circuit DD.

The liquid crystal display panel includes a thin-film transistor array substrate, a counter substrate, and a liquid crystal material disposed between the thin-film transistor array substrate and the counter substrate. The thin-film transistor array substrate includes a substrate, the gate drive circuit GOA, the pixel units P, the scan lines (GL1 to GLn), the data lines (DL1 to DLm), and color resistors, etc. The pixel units P include thin-film transistors, and pixel electrodes, etc., and the thin-film transistors are electrically connected to the pixel electrodes, the scan lines (GL1 to GLn), and the data lines (DL1 to DLm).

The gate drive circuit GOA includes a plurality of gate driver units that are cascaded, each gate driver unit is electrically connected to a row of pixel units P, and the gate driver units are used to provide scan signals to the pixel units P.

The source drive circuit DD is used to provide data signals to the pixel units P.

The timing controller TCON is used to receive external image data and control the gate drive circuit GOA to output the scan signals, as well as control the source drive circuit DD to output the data signals.

The power management chip is used to provide required operating voltages for every parts of a liquid crystal display device where the LCD panel is adopted.

Embodiments of the present application provide a display device, including a display panel and a timing controller TCON, the timing controller TCON is electrically connected to the display panel, and the timing controller TCON includes:

- a storage module for storing a chromaticity coordinate accuracy lookup table;
- a frequency detection module for measuring a duration of a high level of a frame start signal of the display panel;
- a frequency calculation module for calculating a current driving frequency for the display panel based on the duration of the high level;
- a lookup table update module for updating the chromaticity coordinate accuracy lookup table for a predetermined target grayscale when the current driving frequency is lower than a preset threshold; and
- a luminance adjustment module for adjusting luminance of the display device based on the updated chromaticity coordinate accuracy lookup table.

The predetermined target grayscale includes a grayscale of 64 and a grayscale of 127. The preset threshold value is 50 Hz.

When updating the chromaticity coordinate accuracy lookup table, the lookup table update module firstly reads one pre-stored chromaticity coordinate accuracy lookup table for a frequency that is closest to the current driving frequency from the storage module. For example, if the current driving frequency is 72 Hz and the storage module stores lookup tables for 60 Hz and 90 Hz, the lookup table for 90 Hz is read. Then, interpolation calculations are performed on the chromaticity coordinate accuracy data for the predetermined target grayscale (such as the grayscale of 64 and grayscale of 127) based on the read lookup table to obtain updated data suitable for the current driving frequency. In this way, the storage space requirement may be greatly reduced while ensuring the compensation accuracy.

The lookup table update module updates the chromaticity coordinate accuracy lookup table in a segmented manner. The chromaticity coordinate accuracy lookup table is divided into multiple segments, and each of the segments corresponds to a frequency range. For example, the chromaticity coordinate accuracy lookup table is divided into segments that correspond to 30 Hz-60 Hz, 60 Hz-90 Hz, 90 Hz-120 Hz, etc. When the current driving frequency is detected to fall within a certain range, only the segment corresponding to the certain range is updated. This manner may further reduce the storage space requirement while improving the updating efficiency.

The frequency calculation module is further used to calculate a product of a preset maximum driving frequency and a ratio of a duration of the high level of the frame start signal at the preset maximum driving frequency to the measured duration of the high level, to obtain the current driving frequency.

The frequency calculation module calculates the current driving frequency in the following manner. Firstly, a maximum driving frequency is preset, for example, the maximum driving frequency is 144 Hz, and the duration of the high level of the frame start signal at the maximum driving frequency is measured and denoted as $T_{max}$; then, the duration of the high level of the current frame start signal is measured and denoted as $T_{current}$; and finally, the current driving frequency is obtained with using the formula: Current driving frequency=144 Hz×($T_{max}$/$T_{current}$). This calculation manner is simple and efficient, does not require additional hardware support, and can quickly and accurately obtain the current driving frequency.

Of course, the frequency calculation module may also use a lookup table manner to calculate the current driving frequency. A table of correspondences between duration of the high levels and driving frequencies is established in advance and stored in the storage module. After the duration of the high level of the current frame start signal is obtained, the frequency calculation module directly looks up the table to obtain the closest driving frequency. If the value of the measured duration of the high level falls between two items in the table, linear interpolation calculations may be performed to obtain a relatively accurate frequency. This manner can reduce the complexity of real-time calculations and improve the speed of frequency detection.

The lookup table update module is further used to: read a pre-stored chromaticity coordinate accuracy lookup table corresponding to the current driving frequency from the storage module (e.g., storage) when the current driving frequency is lower than the preset threshold, and update the chromaticity coordinate accuracy data for the predetermined target grayscale in the pre-stored chromaticity coordinate accuracy lookup table.

The lookup table update module is further used to perform gradient updating on chromaticity coordinate accuracy data for a grayscale adjacent to the predetermined target grayscale.

The lookup table update module not only updates the chromaticity coordinate accuracy data for the predetermined target grayscale but also performs the gradient updating on the grayscale adjacent to the predetermined target grayscale, thereby ensuring the smoothness of luminance adjustment. The lookup table update module selects 5 grayscales above and 5 grayscales below the target grayscale for updates. For example, if the target grayscale is the grayscale of 64, the grayscale to be updated is in the range of grayscales of 59-69. This technical solution of gradient updating can effectively avoid unnatural image phenomena caused by local luminance adjustments.

The lookup table update module adopts a non-linear gradient update manner to achieve a more refined gradient update. The Gaussian function is used to determine the update weights for the adjacent grayscales. For example, if the target grayscale is grayscale of 64, a formula "Weight=exp (−(x−64)^2/(2×σ^2)" is used to calculate the update weights for the adjacent grayscales, x is the value of an adjacent grayscale, and σ is an adjustable parameter. This manner can achieve a more natural luminance transition.

The lookup table update module is further used to: calculate differences between the chromaticity coordinate accuracy data for the predetermined target grayscale and the chromaticity coordinate accuracy data for the grayscale adjacent to the predetermined target grayscale, and calculate new chromaticity coordinate accuracy data for the grayscale adjacent to the predetermined target grayscale, using linear interpolation based on the differences, for updating.

When performing the gradient updating, the lookup table update module firstly calculates the differences in chromaticity coordinate accuracy data between the predetermined target grayscale and grayscales adjacent to the predetermined target grayscale, for example, the lookup table update module calculates the differences in data between the grayscale of 64 and each of the grayscales of 63 and 65; and the lookup table update module then calculates new data for the adjacent grayscales using linear interpolation based on these differences. The following formula is adopted: New data=Original data+ (Difference×Weight factor), where the weight factor decreases as the distance from the target grayscale increases. This manner can ensure the continuity and naturalness of luminance adjustment.

The lookup table update module adopts an adaptive interpolation manner to update the chromaticity coordinate accuracy data for the adjacent grayscales. Different interpolation manners are dynamically chosen based on the magnitude of the differences in data between the predetermined target grayscale and the adjacent grayscales. For example, linear interpolation is adopted when the difference is small, and cubic spline interpolation is adopted when the difference is large. This manner can improve interpolation accuracy while ensuring update efficiency, especially in areas with significant luminance changes.

The luminance adjustment module is further used to: calculate a luminance compensation value corresponding to currently displayed content based on the updated chromaticity coordinate accuracy lookup table, convert the luminance compensation value into a compensation signal, and superimpose the compensation signal on a driving signal for the display device.

When adjusting the luminance of the display device, the luminance adjustment module firstly calculates the luminance compensation value for each pixel corresponding to the currently displayed content based on the updated chromaticity coordinate accuracy lookup table, then converts these compensation values into an analog voltage signal to serve as the compensation signal, and finally superimposes the compensation signal on the original display driving signal to obtain the final driving signal. This manner can achieve precise luminance compensation at the pixel level, effectively improving the display quality.

The luminance adjustment module adopts a block processing manner to improve efficiency. The luminance adjustment module divides the displayed picture into multiple blocks and calculates the luminance compensation value for each block individually. For example, the picture is divided into 16×16 (i.e., 256) blocks. Then, the luminance adjustment module calculates the compensation value for the central pixel of each block and applies that value to the entire block. This manner can significantly reduce the amount of calculation while maintaining good compensation effects.

The lookup table update module is further used to: calculate a luminance compensation amount for the predetermined target grayscale based on the current driving frequency, and update the chromaticity coordinate accuracy data for the predetermined target grayscale based on the luminance compensation amount.

When updating the chromaticity coordinate accuracy data, the lookup table update module firstly calculates the luminance compensation amount for the predetermined target grayscale based on the current driving frequency, for example, the following formula is adopted. Compensation amount=Base compensation amount×(Base frequency/Current frequency)^n, where n is an adjustable parameter used to control the compensation intensity; and the lookup table update module then applies the obtained compensation amount to the chromaticity coordinate accuracy data for the target grayscale to achieve precise luminance compensation.

The luminance compensation amount is inversely proportional to the current driving frequency because the luminance of the display panel generally increases as the driving frequency decreases. The base frequency (e.g., 60 Hz) and a corresponding base compensation amount are set, and then the compensation amount is adjusted proportionally according to the current frequency. For example, if the current frequency is 30 Hz, the compensation amount may be twice the base compensation amount. This technical solution can ensure accurate luminance compensation at different driving frequencies.

The relationship between the luminance compensation amount and the current driving frequency can be implemented through a piecewise function to adapt to the characteristics of different frequency ranges. For example, it is defined that:

when f≤60 Hz, Compensation amount=k1× (60/f);

when 60 Hz<f≤90 Hz, Compensation amount=k2× (90/f); and when f>90 Hz, Compensation amount=k3× (120/f).

The symbol f represents the frequency, and k1, k2, k3 are adjustable parameters. This technical solution can more precisely control the compensation effects in different frequency ranges.

The lookup table update module is further used to perform the operation of updating the chromaticity coordinate accuracy lookup table for the predetermined target grayscale during the vertical blanking period of a frame.

The lookup table update module performs the updating operation during the vertical blanking period of each frame. The vertical blanking period refers to a short idle period before the display device turns to the next frame of the image. The updating operation is performed during this period, which avoids interference with the normal display process while ensuring the real-time response capability of the display device. The updating operation is triggered at the beginning of the vertical blanking period and completed before the end of the vertical blanking period.

The lookup table update module implements a function to dynamically adjust the timing of updating operation. In addition to the vertical blanking period, the lookup table update module also chooses other idle periods for updating operation according to the load situation of the display device. For example, when it is detected that the content of consecutive frames changes little, this period is utilized for updating operation. This dynamic adjustment technical solution can better balance the resources of the display device and improve overall efficiency.

The lookup table update module is further used to remain an original chromaticity coordinate accuracy lookup table unchanged when the current driving frequency is higher than or equal to the preset threshold.

Since the luminance generally does not change significantly and does not require compensation at relatively high frequencies, the lookup table update module remains the original chromaticity coordinate accuracy lookup table unchanged when the current driving frequency is higher than or equal to the preset threshold to further optimize the performance of the display device. The preset threshold can be set according to the specific characteristics of the display panel. For example, the preset threshold is set to be 90 Hz. This technical solution can reduce unnecessary calculating and updating operations, thereby improving the efficiency.

As an improvement, when detecting that the driving frequency changes from below the preset threshold to higher than or equal to the preset threshold, the lookup table update module does not immediately stop updating but gradually reduces the updating frequency and updating range. For example, in the next few frames, the lookup table update module gradually reduces the number of grayscales to update until completely stops updating. This progressive updating manner can avoid picture jumps that may be caused by sudden cessation of updates.

As an improvement, the lookup table update module has a three-level storage structure consisting of high-speed cache, medium-speed cache, and low-speed cache. The high-speed cache stores complete chromaticity coordinate accuracy data for the most recently used frequency points; the medium-speed cache stores key grayscale data for a relatively large frequency range; and the low-speed cache is the complete chromaticity coordinate accuracy lookup table. This multi-level caching technical solution can achieve an optimal balance of access speed and storage efficiency in different scenarios.

As an improvement, the lookup table update module dynamically adjusts the updating frequency and the updating range based on the speed and magnitude of changes in the current driving frequency. For example, when the frequency changes dramatically, the lookup table update module increases the updating frequency and expands the range of grayscales to be updated; and when the frequency changes slowly, the lookup table update module reduces the updating frequency and narrow the range of grayscales to be updated. This adaptive update technical solution can further optimize the performance and power consumption of the display device while ensuring the compensation effects.

Figure 2:
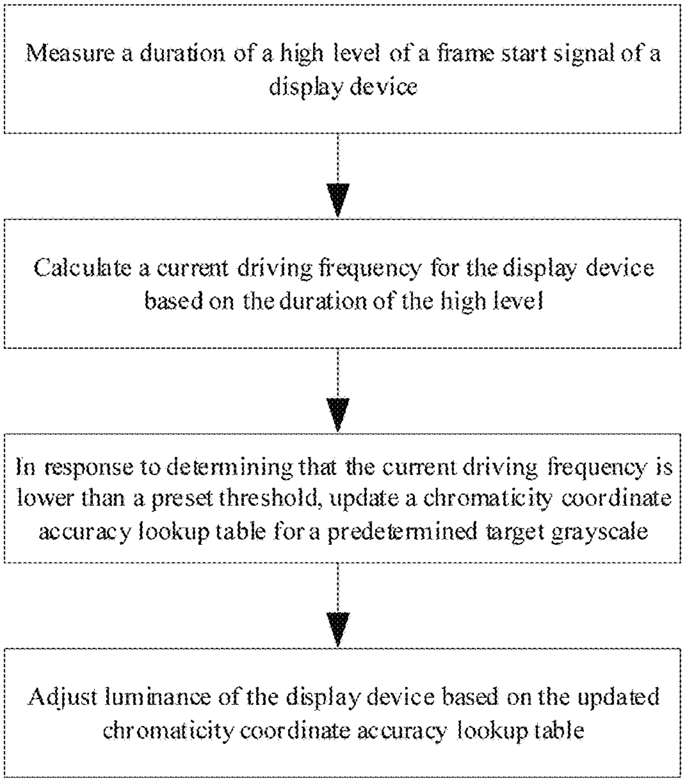
FIG. 2 is a flowchart of a control method for the display device according to some embodiments of the present application.

Embodiments of the present application also provide a control method for a display device. As shown in FIG. 2, the method includes:

measuring a duration of the high level of a frame start signal of the display device;

calculating a current driving frequency for the display device based on the duration of the high level;

updating a chromaticity coordinate accuracy lookup table for a predetermined target grayscale when the current driving frequency is lower than a preset threshold; and adjusting luminance of the display device based on the updated chromaticity coordinate accuracy lookup table.

The predetermined target grayscale includes a grayscale of 64 and a grayscale of 127. The preset threshold value is 50 Hz.

When updating the chromaticity coordinate accuracy lookup table, the lookup table update module firstly reads one pre-stored chromaticity coordinate accuracy lookup table for a frequency that is closest to the current driving frequency from the storage module. For example, if the current driving frequency is 72 Hz and the storage module stores lookup tables for 60 Hz and 90 Hz, the lookup table for 90 Hz is read. Then, interpolation calculations are performed on the chromaticity coordinate accuracy data for the predetermined target grayscale (such as the grayscale of 64 and grayscale of 127) based on the read lookup table to obtain updated data suitable for the current driving frequency. In this way, the storage space requirement may be greatly reduced while ensuring the compensation accuracy.

The lookup table update module updates the chromaticity coordinate accuracy lookup table in a segmented manner. The chromaticity coordinate accuracy lookup table is divided into multiple segments, and each of the segments corresponds to a frequency range. For example, the chromaticity coordinate accuracy lookup table is divided into segments that correspond to 30 Hz-60 Hz, 60 Hz-90 Hz, 90 Hz-120 Hz, etc. When the current driving frequency is detected to fall within a certain range, only the segment corresponding to the certain range is updated. This manner may further reduce the storage space requirement while improving the updating efficiency.

The step of calculating the current driving frequency for the display device based on the duration of the high level includes:

calculating a product of a preset maximum driving frequency and a ratio of a duration of the high level of the frame start signal at the preset maximum driving frequency to the measured duration of the high level, to obtain the current driving frequency.

The frequency calculation module calculates the current driving frequency in the following manner. Firstly, a maximum driving frequency is preset, for example, the maximum driving frequency is 144 Hz, and the duration of the high level of the frame start signal at the maximum driving frequency is measured and denoted as T_max; then, the duration of the high level of the current frame start signal is measured and denoted as T_current; and finally, the current driving frequency is obtained with using the formula: Current driving frequency=144 Hz×(T_max/T_current). This calculation manner is simple and efficient, does not require additional hardware support, and can quickly and accurately obtain the current driving frequency.

Of course, the frequency calculation module may also use a lookup table manner to calculate the current driving frequency. A table of correspondences between duration of the high levels and driving frequencies is established in advance and stored in the storage module. After the duration of the high level of the current frame start signal is obtained, the frequency calculation module directly looks up the table to obtain the closest driving frequency. If the value of the measured duration of the high level falls between two items in the table, linear interpolation calculations may be performed to obtain a relatively accurate frequency. This manner can reduce the complexity of real-time calculations and improve the speed of frequency detection.

The step of updating the chromaticity coordinate accuracy lookup table for the predetermined target grayscale when the current driving frequency is lower than the preset threshold includes:

reading a pre-stored chromaticity coordinate accuracy lookup table corresponding to the current driving frequency from a storage module when the current driving frequency is lower than the preset threshold; and updating the chromaticity coordinate accuracy data for the predetermined target grayscale in the pre-stored chromaticity coordinate accuracy lookup table.

The step of updating the chromaticity coordinate accuracy lookup table for the predetermined target grayscale when the current driving frequency is lower than the preset threshold further includes:

performing gradient updating on chromaticity coordinate accuracy data for a grayscale adjacent to the predetermined target grayscale.

The lookup table update module not only updates the chromaticity coordinate accuracy data for the predetermined target grayscale but also performs the gradient updating on the grayscale adjacent to the predetermined target grayscale, thereby ensuring the smoothness of luminance adjustment.

The lookup table update module selects 5 grayscales above and 5 grayscales below the target grayscale for updates. For example, if the target grayscale is the grayscale of 64, the grayscale to be updated is in the range of grayscales of 59-69. This technical solution of gradient updating can effectively avoid unnatural image phenomena caused by local luminance adjustments.

The lookup table update module adopts a non-linear gradient update manner to achieve a more refined gradient update. The Gaussian function is used to determine the update weights for the adjacent grayscales. For example, if the target grayscale is the grayscale of 64, a formula "Weight=exp (−(x−64)ˆ2/(2×ˆ2)" is used to calculate the update weights for the adjacent grayscales, x is the value of an adjacent grayscale, and σ is an adjustable parameter. This manner can achieve a more natural luminance transition.

The step of performing the gradient updating on the chromaticity coordinate accuracy data for the grayscales adjacent to the predetermined target grayscale includes:

calculating differences between the chromaticity coordinate accuracy data for the predetermined target grayscale and the chromaticity coordinate accuracy data for the grayscale adjacent to the predetermined target grayscale; and calculating new chromaticity coordinate accuracy data for the grayscale adjacent to the predetermined target grayscale, using linear interpolation based on the differences, for updating.

When performing the gradient updating, the lookup table update module firstly calculates the differences in chromaticity coordinate accuracy data between the predetermined target grayscale and the grayscales adjacent to the predetermined target grayscale, for example, the lookup table update module calculates the differences in data between the grayscale of 64 and each of the grayscales of 63 and 65; and the lookup table update module then calculates new data for the adjacent grayscales using linear interpolation based on these differences. The following formula is adopted: New data=Original data+ (Difference×Weight factor), where the weight factor decreases as the distance from the target grayscale increases. This manner can ensure the continuity and naturalness of luminance adjustment.

The lookup table update module adopts an adaptive interpolation manner to update the chromaticity coordinate accuracy data for the adjacent grayscales. Different interpolation manners are dynamically chosen based on the magnitude of the differences in data between the predetermined target grayscale and the adjacent grayscales. For example, linear interpolation is adopted when the difference is small, and cubic spline interpolation is adopted when the difference is large. This manner can improve interpolation accuracy while ensuring update efficiency, especially in areas with significant luminance changes.

The step of adjusting the luminance of the display device based on the updated chromaticity coordinate accuracy lookup table includes:

calculating a luminance compensation value corresponding to currently displayed content based on the updated chromaticity coordinate accuracy lookup table;

converting the luminance compensation value into a compensation signal, and superimposing the compensation signal on a driving signal for the display device.

When adjusting the luminance of the display device, the luminance adjustment module firstly calculates the luminance compensation value for each pixel corresponding to the currently displayed content based on the updated chromaticity coordinate accuracy lookup table, then converts these compensation values into an analog voltage signal to serve as the compensation signal, and finally superimposes the compensation signal on the original display driving signal to obtain the final driving signal. This manner can achieve precise luminance compensation at the pixel level, effectively improving the display quality.

The luminance adjustment module adopts a block processing manner to improve efficiency. The luminance adjustment module divides the displayed picture into multiple blocks and calculates the luminance compensation value for each block individually. For example, the picture is divided into 16×16 (i.e., 256) blocks. Then, the luminance adjustment module calculates the compensation value for the central pixel of each block and applies that value to the entire block. This manner can significantly reduce the amount of calculation while maintaining good compensation effects.

The step of updating the chromaticity coordinate accuracy lookup table for the predetermined target grayscale when the current driving frequency is lower than the preset threshold further includes:

calculating a luminance compensation amount for the predetermined target grayscale based on the current driving frequency; and updating the chromaticity coordinate accuracy data for the predetermined target grayscale based on the luminance compensation amount.

When updating the chromaticity coordinate accuracy data, the lookup table update module firstly calculates the luminance compensation amount for the predetermined target grayscale based on the current driving frequency, for example, the following formula is adopted. Compensation amount=Base compensation amount×(Base frequency/Current frequency)ˆn, where n is an adjustable parameter used to control the compensation intensity; and the lookup table update module then applies the obtained compensation amount to the chromaticity coordinate accuracy data for the target grayscale to achieve precise luminance compensation.

The luminance compensation amount is inversely proportional to the current driving frequency because the luminance of the display panel generally increases as the driving frequency decreases. The base frequency (e.g., 60 Hz) and a corresponding base compensation amount are set, and then the compensation amount is adjusted proportionally according to the current frequency. For example, if the current frequency is 30 Hz, the compensation amount may be twice the base compensation amount. This technical solution can ensure accurate luminance compensation at different driving frequencies.

The relationship between the luminance compensation amount and the current driving frequency can be implemented through a piecewise function to adapt to the characteristics of different frequency ranges. For example, it is defined that:

when f≤60 Hz, Compensation amount=k1×(60/f);

when 60 Hz<f≤90 Hz, Compensation amount=k2× (90/f); and when f>90 Hz, Compensation amount=k3× (120/f).

F is the frequency, and k1, k2, k3 are adjustable parameters. This technical solution can more precisely control the compensation effects in different frequency ranges.

During the vertical blanking period of a frame, the chromaticity coordinate accuracy lookup table is updated for the predetermined target grayscale when the current driving frequency is lower than the preset threshold.

The lookup table update module performs the updating operation during the vertical blanking period of each frame.

The vertical blanking period refers to a short idle period before the display device turns to the next frame of the image. The updating operation is performed during this period, which avoids interference with the normal display process while ensuring the real-time response capability of the display device. The updating operation is triggered at the beginning of the vertical blanking period and completed before the end of the vertical blanking period.

The lookup table update module implements a function to dynamically adjust the timing of updating operation. In addition to the vertical blanking period, the lookup table update module also chooses other idle periods for updating operation according to the load situation of the display device. For example, when it is detected that the content of consecutive frames changes little, this period is utilized for updating operation. This dynamic adjustment technical solution can better balance the resources of the display device and improve overall efficiency.

The method further includes:

remaining an original chromaticity coordinate accuracy lookup table unchanged when the current driving frequency is higher than or equal to the preset threshold.

Since the luminance generally does not change significantly and does not require compensation at relatively high frequencies, the lookup table update module remains the original chromaticity coordinate accuracy lookup table unchanged when the current driving frequency is higher than or equal to the preset threshold to further optimize the performance of the display device. The preset threshold is set according to the specific characteristics of the display panel. For example, the preset threshold is set to be 90 Hz. This technical solution can reduce unnecessary calculating and updating operations, thereby improving the efficiency.

As an improvement, when detecting that the driving frequency changes from below the preset threshold to higher than or equal to the preset threshold, the lookup table update module does not immediately stop updating but gradually reduces the updating frequency and updating range. For example, in the next few frames, the lookup table update module gradually reduces the number of grayscales to update until completely stops updating. This progressive updating manner can avoid picture jumps that may be caused by sudden cessation of updates.

As an improvement, the lookup table update module has a three-level storage structure consisting of high-speed cache, medium-speed cache, and low-speed cache. The high-speed cache stores complete chromaticity coordinate accuracy data for the most recently used frequency points; the medium-speed cache stores key grayscale data for a relatively large frequency range; and the low-speed cache is the complete chromaticity coordinate accuracy lookup table. This multi-level caching technical solution can achieve an optimal balance of access speed and storage efficiency in different scenarios.

As an improvement, the lookup table update module dynamically adjusts the updating frequency and the updating range based on the speed and magnitude of changes in the current driving frequency. For example, when the frequency changes dramatically, the lookup table update module increases the updating frequency and expands the range of grayscales to be updated; and when the frequency changes slowly, the lookup table update module reduces the updating frequency and narrow the range of grayscales to be updated. This adaptive update technical solution can further optimize the performance and power consumption of the display device while ensuring the compensation effects.

Figure 3:
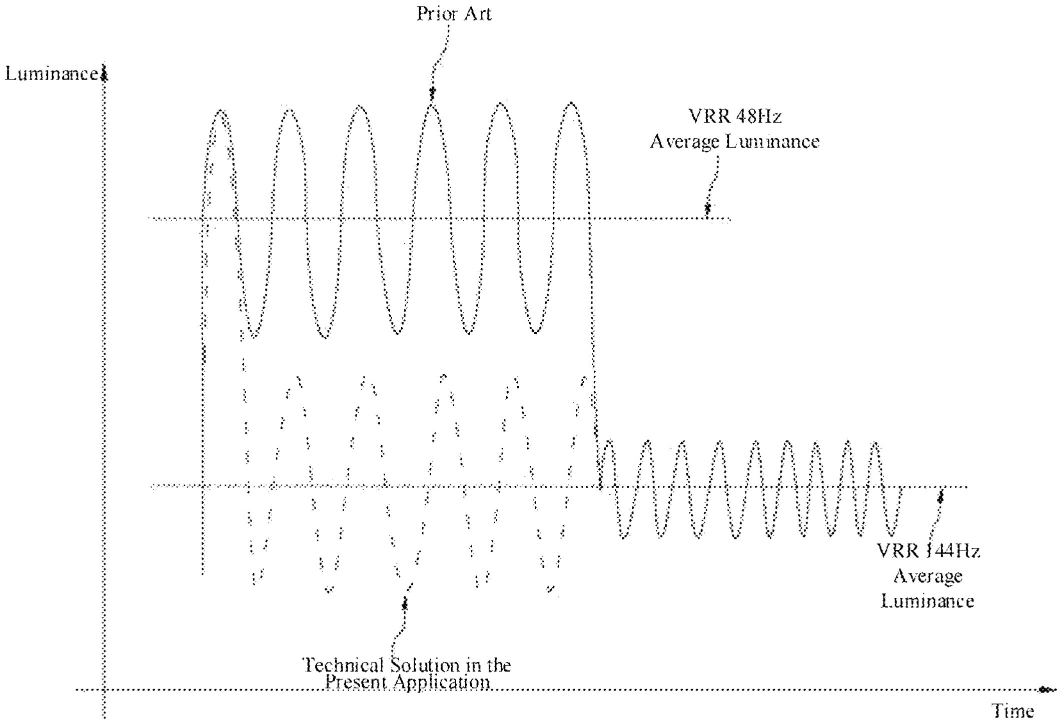
FIG. 3 illustrates the effect of improving the stability of the average luminance of the displayed picture according to some embodiments of the present application.

FIG. 3 illustrates the effect of improving the stability of the average luminance of the displayed picture according to some embodiments of the present application. In FIG. 3, the horizontal axis represents time, and the vertical axis represents the luminance of the displayed picture.

It can be seen from FIG. 3 that, when the refresh rate of display devices switches from 48 Hz to 144 Hz, the display device using the solution in the prior art appears a noticeable luminance jump at the switching point. This sudden change in luminance may cause users to perceive flicker, affecting the viewing experience.

In contrast, the display device using the technical solution of the present application maintains the average luminance of the displayed picture essentially stable when the refresh rate switches from 48 Hz to 144 Hz, without any noticeable jumps. This indicates that the technical solution of the present application can effectively compensate for the luminance changes caused by changes in refresh rate, thereby providing a more stable and comfortable visual experience.

Figure 4:
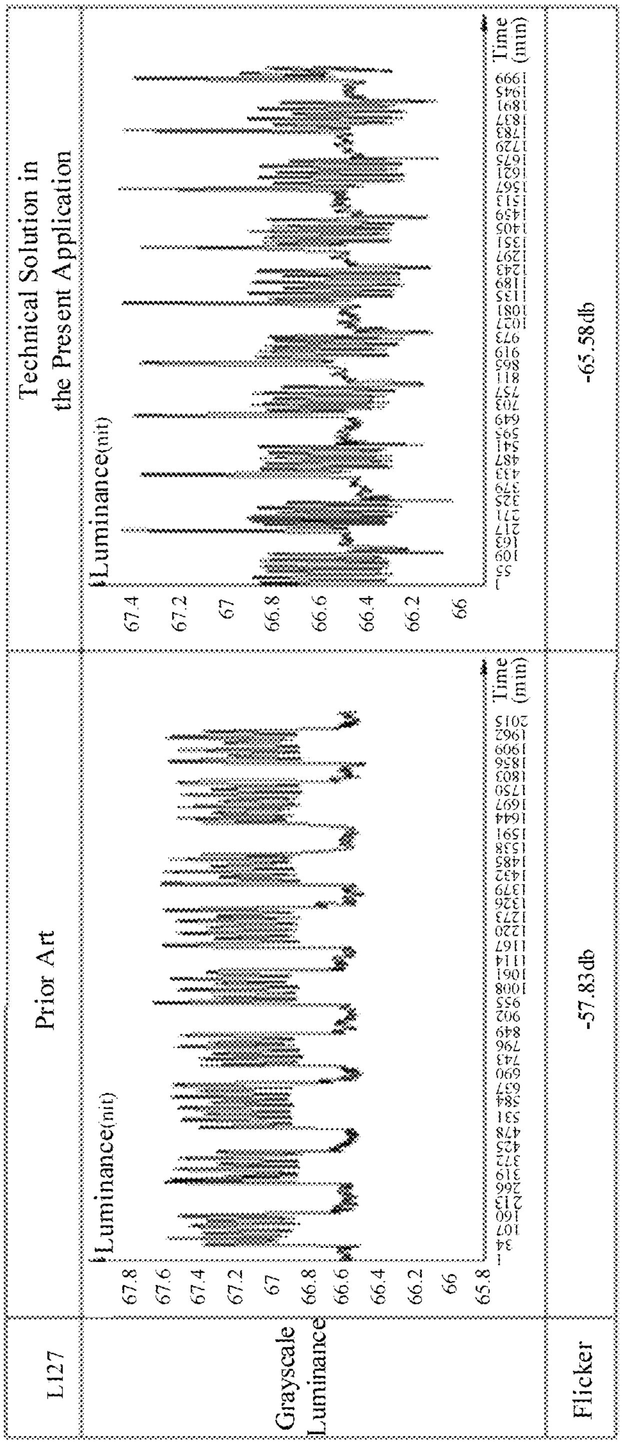
FIG. 4 illustrates the effect of reducing the degree of picture flicker according to some embodiments of the present application as compared with the prior art.

FIG. 4 illustrates the effect of reducing the degree of picture flicker according to some embodiments of the present application as compared with the prior art, where comparison of the flicker of the display device of the prior art and the flicker of the display device according to some embodiments of the present application is under the grayscale of L127.

The left graph represents the display device using the solution in the prior art, with a flicker level of −57.83 dB for the picture at the grayscale of L127; and the right graph represents the display device using the technical solution of the present application, with the flicker level for the picture at the grayscale of L127 reduced to −65.58 dB.

This result clearly shows that the technical solution of the present application significantly reduces the degree of picture flicker. Compared with the prior art, the method of the present application reduces the flicker level for the grayscale of L127 by about 7.75 dB. The reduction in flicker level means that users perceive less luminance fluctuation during changes in refresh rate.

The technical solution of selectively updating the chromaticity coordinate accuracy lookup table is adopted in the present application, and the chromaticity coordinate accuracy data is updated for the predetermined target grayscale only when the current driving frequency is lower than the preset threshold, which greatly reduces the storage space requirement of the timing controller to store chromaticity coordinate accuracy lookup tables. Especially in practical applications where only the chromaticity coordinate accuracy data for the grayscale of 64 and grayscale of 127 need to be updated, the storage space requirement for the chromaticity coordinate accuracy lookup table in the timing controller can be reduced by more than 254 times, effectively solving the problem of large storage space requirement of timing controllers in the prior art.

Moreover, the current driving frequency is calculated by measuring the duration of the high level of the frame start signal in the present application, without the need for additional hardware support, thereby effectively reducing hardware costs. In addition, this method utilizes the existing frame start signal, simplifying the frequency detection process while ensuring the accuracy of frequency detection. Compared with traditional manners that require additional timers or microcontrollers, the technical solution of the present application can achieve frequency detection without increasing hardware costs, solving the problem of high hardware costs required for frequency detection in the prior art.

In addition, the smoothness of luminance adjustment is ensured by performing gradient updating on the grayscales adjacent to the predetermined target grayscale in the present application, avoiding unnatural image phenomena caused by local luminance adjustments. This manner further optimizes storage utilization while ensuring compensation effects. Through the precise gradient updating, the technical solution of the present application not only reduces the storage space requirement for the chromaticity coordinate accuracy lookup tables in the timing controller TCON, but also improves compensation accuracy, thereby solving the problem of insufficient compensation accuracy in the prior art.

Besides, the method of the present application achieves precise luminance compensation by calculating the luminance compensation amount and applying the luminance compensation amount to the updates of chromaticity coordinate accuracy data. Since the luminance compensation amount is inversely proportional to the current driving frequency, adaptive luminance adjustment can be realized at different driving frequencies, further improving the compensation accuracy.

Furthermore, the method of the present application avoids interference with the normal display process by performing the operation of updating the lookup table during the vertical blanking period of each display frame, ensuring the real-time response capability of the display device. This technical solution not only improves the efficiency but also further reduces the storage space requirement of the timing controller TCON, as the updating operations can be carried out in real-time during the display process without the need to store a large amount of pre-calculated data.

The embodiments of the present application provide the display device and the method for the display device for addressing the issue of large storage space requirement for storing compensation data in the timing controller TCON in variable refresh rate (VRR) technologies.

The display device according to some embodiments of the present application includes a display panel and a timing controller TCON. The timing controller TCON is electrically connected to the display panel and is used to control the driving for the display panel. The timing controller TCON includes the storage module, the frequency detection module, the frequency calculation module, the lookup table update module, and the luminance adjustment module.

The storage module is used to store the chromaticity coordinate accuracy lookup table; the frequency detection module is used to measure the duration of the high level of the frame start signal; the frequency calculation module is used to calculate the current driving frequency based on the duration of the high level; the lookup table update module is used to update the chromaticity coordinate accuracy lookup table for the predetermined target grayscale when the current driving frequency is lower than the preset threshold; and the luminance adjustment module is used to adjust the luminance of the display device based on the updated chromaticity coordinate accuracy lookup table.

The method for the display device according to some embodiments of the present application includes the following steps.

In step S1, the duration of the high level of the frame start signal of the display device is measured.

The frequency detection module measures the duration of the high level of the frame start signal. The frame start signal (start of vertical (STV) signal) can be a signal of the gate integrated circuit on the array substrate (GOA).

In step S2, the current driving frequency for the display device is calculated based on the duration of the high level.

The frequency calculation module calculates the product of the preset maximum driving frequency and the ratio of the duration of the high level of the frame start signal at the preset maximum driving frequency to the measured duration of the high level, to obtain the current driving frequency.

For example, it is assumed that, the preset maximum driving frequency is 144 Hz, the duration of the high level of the STV signal at 144 Hz is A, and the currently measured duration of the high level of the STV signal is B. Then, the current driving frequency can be calculated with using the following formula.

Current driving frequency=144 Hz×(A/B).

In step S3, when the current driving frequency is lower than the preset threshold, the chromaticity coordinate accuracy lookup table is updated for the predetermined target grayscale. The lookup table update module firstly determines whether the current driving frequency is lower than the preset threshold. If the current driving frequency is lower than the preset threshold, the lookup table update module reads the pre-stored chromaticity coordinate accuracy lookup table corresponding to the current driving frequency from the storage module, and updates the chromaticity coordinate accuracy data for the predetermined target grayscale in the pre-stored chromaticity coordinate accuracy lookup table.

The predetermined target grayscale may include the grayscale of 64 and grayscale of 127, which are not limited to these two grayscales. The preset threshold may be set to be 50 Hz, and may also be adjusted according to actual needs.

The updating process further includes performing gradient updating on the chromaticity coordinate accuracy data for the grayscale adjacent to the predetermined target grayscale. The lookup table update module calculates the difference between the chromaticity coordinate accuracy data for the predetermined target grayscale and the chromaticity coordinate accuracy data for the grayscale adjacent to the predetermined target grayscale, and then calculates new chromaticity coordinate accuracy data for the grayscale adjacent to the predetermined target grayscale, using linear interpolation based on the difference, for updating.

In addition, the lookup table update module further calculates the luminance compensation amount for the predetermined target grayscale based on the current driving frequency, and updates the chromaticity coordinate accuracy data for the predetermined target grayscale based on the luminance compensation amount. The luminance compensation amount is inversely proportional to the current driving frequency. That is, the lower the driving frequency, the greater the luminance compensation amount.

In step S4, the luminance of the display device is adjusted based on the updated chromaticity coordinate accuracy lookup table.

The luminance adjustment module calculates the luminance compensation value corresponding to the currently displayed content based on the updated chromaticity coordinate accuracy lookup table, and then converts the luminance compensation value into the compensation signal and superimposes the compensation signal on the driving signal for the display device to achieve luminance adjustment.

TABLE 1

| Technical | Prior Art | | Technical Solution of the Present Application | |
|---|---|---|---|---|
| Solution | Description | Disadvantages | Description | Advantages |
| Frequency Detection | Timers are generally used to measure the vertical blanking period to identify the driving frequency. | Hardware costs will increase significantly to achieve a high-precision functionality of the timers. | The duration of the high level of the frame start signal (STV signal) is measured, and then the current driving frequency is calculated based on the duration. | The frequency detection manner is simple and does not require additional hardware support, thus not increasing costs. |
| Luminance Compensation | / | / | An accuracy chromaticity coordinate (ACC) lookup table is constructed and updated only for the predetermined target grayscale (such as grayscale of 64 and grayscale of 127) at the driving frequencies. This selective updating manner greatly reduces the storage space requirement. | Not only does it significantly reduce the storage space requirement for the chromaticity coordinate accuracy lookup table in the timing controller, avoiding cost increases, but it also maintains high-precision adjustment capabilities, achieving good compensation effects. |

Table 1 compares the differences between the technical solution of the present application and the solution in the prior art in terms of frequency detection and luminance compensation.

In terms of frequency detection technologies, timers are used to measure the vertical blanking period to identify the frequency in the prior art, which requires integrating timers into the timing controller or adding microcontroller cores, leading to increased costs. In contrast, the technical solution of the present application determines the frequency by measuring the duration of the high level of the frame start signal (STV), which does not require additional hardware, thus not increasing costs.

In terms of luminance compensation technologies, an ACC lookup table (also referred to as the chromaticity coordinate accuracy lookup table in the embodiments of the present application) is constructed and luminance swapping is performed only at the required grayscale and frequency in the technical solution of the present application. This manner not only greatly reduces the storage requirement but also maintains a relatively high precision adjustment, achieving good compensation effects without increasing costs.

TABLE 2

| Picture Grayscale | Frequency Switching Manner | Whether to adopt the technical solution of the present application | Data obtained from tests conducted on a 16-inch wide display panel with the refresh rate of 165 Hz | Customer's Specification Requirements | Description |
|---|---|---|---|---|---|
| L64 | 48 Hz <-> 144 Hz | Not<br>Yes | −54 dB<br>−65 dB | less than −55 dB | By updating the compensation value (ACC offset) in the chromaticity coordinate accuracy lookup table, the flicker level is reduced from −57 dB to −65 dB, resulting in an 8 dB reduction. |
| L127 | 48 Hz <-> 144 Hz | Not<br>Yes | −57 dB<br>−65 dB | less than −60 dB | By updating the compensation value (ACC offset) in the chromaticity coordinate accuracy lookup table, the flicker level is reduced from −57 dB |

TABLE 2-continued

| Picture Grayscale | Frequency Switching Manner | Whether to adopt the technical solution of the present application | Data obtained from tests conducted on a 16-inch wide display panel with the refresh rate of 165 Hz | Customer's Specification Requirements | Description |
|---|---|---|---|---|---|
| | | | | | to −65 dB, improving by 8 dB. |
| | | Result | | Pass | |

The embodiments of the present application were tested on the 16-inch wide display panel with the refresh rate of 165 Hz, and the test results are shown in Table 2.

Table 2 shows the test results when switching between 48 Hz and 144 Hz at two different grayscales (L64 and L127). For the grayscale of L64, the flicker level is-54 dB without adopting the technical solution of the present application, and the flicker level is reduced to −65 dB after adopting the technical solution of the present application, which has an improvement of 11 dB. For the grayscale of L127, the flicker level is-57 dB without adopting the technical solution of the present application, and the flicker level is reduced to −65 dB after adopting the technical solution of the present application, which has an improvement of 8 dB. The unit dB represents the stimulation of picture flicker to the human eye.

Customers require the flicker level to be lower than-55 dB for the grayscale of L64, and to be lower than-60 dB for the grayscale of L127. The test results show that, the flicker levels for both grayscales reach-65 dB after adopting the technical solution of the present application, and the test results for both grayscales are better than the specification requirement of −60 dB.

The method for the display device according to some embodiments of the present application selectively updates the chromaticity coordinate accuracy lookup table, and only updates the chromaticity coordinate accuracy data for the predetermined target grayscale when the current driving frequency is lower than the preset threshold, which greatly reduces the storage space requirement of the timing controller to store the chromaticity coordinate accuracy lookup tables. Especially in practical applications where only the chromaticity coordinate accuracy data for the grayscale of 64 and grayscale of 127 need to be updated, the storage space requirement for the chromaticity coordinate accuracy lookup table in the timing controller can be reduced by more than 254 times, effectively solving the problem of large storage space requirement of timing controllers in the prior art.

In addition, the method according to some embodiments of the present application also ensures the smoothness of luminance adjustment by performing gradient updating on the data of adjacent grayscales, avoiding unnatural image phenomena caused by local luminance adjustments.

The method for the display device according to some embodiments of the present application may be applied to various types of liquid crystal displays, especially suitable for display devices sensitive to refresh rate changes, such as gaming monitors. For example, this method has been successfully applied to 16-inch wide display panels with refresh rate of 165 Hz and has achieved mass production.

In summary, the display device and the method for the display device according to some embodiments of the present application achieve luminance compensation for variable refresh rates through innovative frequency detection manners and selective chromaticity coordinate accuracy lookup table updating manners, without increasing hardware costs. This method not only greatly reduces the storage space requirement for the chromaticity coordinate accuracy lookup table in the timing controller TCON but also ensures good compensation effects, improving the performance of liquid crystal displays and reducing costs.

Some embodiments of the present application have been described in detail above. The description of the above embodiments merely aims to help to understand the present application. Many modifications or equivalent substitutions with respect to the embodiments may occur to those of ordinary skill in the art based on the present application. Thus, these modifications or equivalent substitutions shall fall within the scope of the present application.

What is claimed is:

1. A method, comprising:

measuring a duration of a high level of a frame start signal of a display device; calculating a current driving frequency for the display device based on the duration of the high level;

in response to determining that the current driving frequency is lower than a preset threshold, updating a chromaticity coordinate accuracy lookup table for a predetermined target grayscale; and adjusting luminance of the display device based on the updated chromaticity coordinate accuracy lookup table, and wherein the calculating of the current driving frequency comprises: calculating a product of a preset maximum driving frequency and a ratio of a duration of the high level of the frame start signal at the preset maximum driving frequency to the measured duration of the high level, to obtain the current driving frequency.

2. The method as claimed in claim 1, wherein the updating of the chromaticity coordinate accuracy lookup table for the predetermined target grayscale comprises:

reading a pre-stored chromaticity coordinate accuracy lookup table corresponding to the current driving frequency from a storage; and updating chromaticity coordinate accuracy data for the predetermined target grayscale in the pre-stored chromaticity coordinate accuracy lookup table.

3. The method as claimed in claim 2, wherein the updating of the chromaticity coordinate accuracy lookup table for the predetermined target grayscale further comprises:

performing gradient updating on chromaticity coordinate accuracy data for a grayscale adjacent to the predetermined target grayscale.

4. The method as claimed in claim 3, wherein the performing of the gradient updating comprises:

calculating a difference between the chromaticity coordinate accuracy data for the predetermined target grayscale and the chromaticity coordinate accuracy data for the grayscale adjacent to the predetermined target grayscale; and calculating new chromaticity coordinate accuracy data for the grayscale adjacent to the predetermined target grayscale, using linear interpolation based on the difference, for updating.

5. The method as claimed in claim 1, wherein the adjusting of the luminance of the display device comprises:

calculating a luminance compensation value corresponding to currently displayed content based on the updated chromaticity coordinate accuracy lookup table;

converting the luminance compensation value into a compensation signal; and superimposing the compensation signal on a driving signal for the display device.

6. The method as claimed in claim 1, wherein the updating of the chromaticity coordinate accuracy lookup table for the predetermined target grayscale comprises:

calculating a luminance compensation amount for the predetermined target grayscale based on the current driving frequency; and updating chromaticity coordinate accuracy data for the predetermined target grayscale based on the luminance compensation amount.

7. The method as claimed in claim 6, wherein the luminance compensation amount is inversely proportional to the current driving frequency.

8. The method as claimed in claim 1, further comprising:

in response to determining that the current driving frequency is higher than or equal to the preset threshold, remaining an original chromaticity coordinate accuracy lookup table unchanged.

9. A display device, comprising: a display panel; and a timing controller electrically connected to the display panel and configured to perform operations comprising:

measuring a duration of a high level of a frame start signal of the display panel;

calculating a current driving frequency for the display panel based on the duration of the high level;

in response to determining that the current driving frequency is lower than a preset threshold, updating a chromaticity coordinate accuracy lookup table for a predetermined target grayscale; and adjusting luminance of the display panel based on the updated chromaticity coordinate accuracy lookup table, and wherein the calculating of the current driving frequency comprises: calculating a product of a preset maximum driving frequency and a ratio of a duration of the high level of the frame start signal at the preset maximum driving frequency to the measured duration of the high level, to obtain the current driving frequency.

10. The display device as claimed in claim 9, wherein the updating of the chromaticity coordinate accuracy lookup table for the predetermined target grayscale comprises:

reading a pre-stored chromaticity coordinate accuracy lookup table corresponding to the current driving frequency from a storage; and updating chromaticity coordinate accuracy data for the predetermined target grayscale in the pre-stored chromaticity coordinate accuracy lookup table.

11. The display device as claimed in claim 10, wherein the updating of the chromaticity coordinate accuracy lookup table for the predetermined target grayscale further comprises:

performing gradient updating on chromaticity coordinate accuracy data for a grayscale adjacent to the predetermined target grayscale.

12. The display device as claimed in claim 11, wherein the performing of the gradient updating comprises:

calculating a difference between the chromaticity coordinate accuracy data for the predetermined target grayscale and the chromaticity coordinate accuracy data for the grayscale adjacent to the predetermined target grayscale; and calculating new chromaticity coordinate accuracy data for the grayscale adjacent to the predetermined target grayscale, using linear interpolation based on the difference, for updating.

13. The display device as claimed in claim 9, wherein the adjusting of the luminance of the display panel comprises:

calculating a luminance compensation value corresponding to currently displayed content based on the updated chromaticity coordinate accuracy lookup table;

converting the luminance compensation value into a compensation signal; and superimposing the compensation signal on a driving signal for the display panel.

14. The display device as claimed in claim 9, wherein the updating of the chromaticity coordinate accuracy lookup table for the predetermined target grayscale comprises:

calculating a luminance compensation amount for the predetermined target grayscale based on the current driving frequency; and updating chromaticity coordinate accuracy data for the predetermined target grayscale based on the luminance compensation amount.

15. The display device as claimed in claim 14, wherein the luminance compensation amount is inversely proportional to the current driving frequency.

16. The display device as claimed in claim 9, wherein the operations further comprise:

in response to determining that the current driving frequency is higher than or equal to the preset threshold, remaining an original chromaticity coordinate accuracy lookup table unchanged.

* * * * *